(12) United States Patent
Suzuki (10) Patent No.: US 11,203,380 B2
(45) Date of Patent: Dec. 21, 2021

(54) STEERING ASSISTANCE DEVICE AND STEERING ASSISTANCE METHOD

(71) Applicant: ISUZU MOTORS LIMITED, Tokyo (JP)

(72) Inventor: Teruhiko Suzuki, Ayase (JP)

(73) Assignee: ISUZU MOTORS LIMITED, Tokyo (JP)

( * ) Notice: Subject to any disclaimer, the term of this patent is extended or adjusted under 35 U.S.C. 154(b) by 390 days.

(21) Appl. No.: 16/320,946

(22) PCT Filed: Jul. 26, 2017

(86) PCT No.: PCT/JP2017/027012
§ 371 (c)(1),
(2) Date: Jan. 25, 2019

(87) PCT Pub. No.: WO2018/021397
PCT Pub. Date: Feb. 1, 2018

(65) Prior Publication Data
US 2019/0256140 A1    Aug. 22, 2019

(30) Foreign Application Priority Data
Jul. 27, 2016    (JP) .............................. JP2016-146988

(51) Int. Cl.
*B62D 15/02*    (2006.01)
*B62D 5/04*    (2006.01)
(Continued)

(52) U.S. Cl.
CPC ........... *B62D 15/025* (2013.01); *B62D 5/046* (2013.01); *B62D 5/065* (2013.01); *B62D 5/091* (2013.01); *B62D 6/008* (2013.01)

(58) Field of Classification Search
CPC ...... B62D 15/025; B62D 6/008; B62D 5/091; B62D 5/046; B62D 5/065
See application file for complete search history.

(56) References Cited

U.S. PATENT DOCUMENTS 5,765,116 A     6/1998    Wilson-Jones et al.
2007/0017735 A1*  1/2007    Kataoka ............... B62D 5/0463
                                           180/446
(Continued)

FOREIGN PATENT DOCUMENTS

| CN | 101746411 A | 6/2010 |
| CN | 102700605 A | 10/2012 |

(Continued)

OTHER PUBLICATIONS

Extended European Search Report for related European Application No. 17834399.2, dated Jul. 5, 2019; 5 pages.
(Continued)

*Primary Examiner* — Russell Frejd
(74) *Attorney, Agent, or Firm* — Procopio, Cory, Hargreaves & Savitch LLP (57) ABSTRACT

In a steering assistance device 1, a steering control unit 74 causes a first auxiliary unit 14 to generate torque with reducing by a predetermined amount and causes a second auxiliary unit 20 to generate torque equal to or less than the decreased predetermined amount, in a case where the first auxiliary unit 14 is able to generate a steering assistance force such that a steering angle of a vehicle can reach a target steering angle determined according to curvature so as to make the vehicle travel in the center of a lane.

3 Claims, 5 Drawing Sheets

(51) Int. Cl.
  *B62D 5/065* (2006.01)
  *B62D 6/00* (2006.01)
  *B62D 5/09* (2006.01)

(56) References Cited

U.S. PATENT DOCUMENTS

| | | |
|---|---|---|
| 2007/0235240 A1 | 10/2007 | Lauer et al. |
| 2010/0147618 A1 | 6/2010 | Osonoi et al. |
| 2011/0015850 A1* | 1/2011 | Tange .................. B62D 15/025 701/116 |
| 2011/0251758 A1* | 10/2011 | Kataoka ............... B62D 15/025 701/41 |
| 2013/0118826 A1 | 5/2013 | Izutani et al. |
| 2014/0012470 A1 | 1/2014 | Kim et al. |
| 2017/0012470 A1 | 1/2017 | Nakano et al. |

FOREIGN PATENT DOCUMENTS

| | | |
|---|---|---|
| CN | 103101571 A | 5/2013 |
| CN | 103523076 A | 1/2014 |
| JP | H03-281479 A | 12/1991 |
| JP | H11-147473 A | 6/1999 |
| JP | H11-198844 A | 7/1999 |
| JP | 2000-159135 A | 6/2000 |
| JP | 2003-063432 A | 3/2003 |
| JP | 2006-264622 A | 10/2006 |
| JP | 2008-260329 A | 10/2008 |
| JP | 2013-010380 A | 1/2013 |
| JP | 2014-015197 A | 1/2014 |
| JP | 2014-080061 A | 5/2014 |
| JP | 2015217737 A | 12/2015 |
| WO | 2013/034514 A1 | 3/2013 |

OTHER PUBLICATIONS

Office Action in the corresponding Chinese patent application No. 201780045882.5, dated Sep. 21, 2020, English translation provided. Total 10 pages.

International Search Report and Written Opinion for related International Application No. PCT/JP2017/027012, dated Oct. 24, 2017; English translation of ISR provided; 9 pages.

Office Action for related JP App. No. 2016146988 dated Jun. 23, 2020. English translation provided; 11 pages.

\* cited by examiner

STEERING ASSISTANCE DEVICE AND STEERING ASSISTANCE METHOD

CROSS-REFERENCE TO RELATED APPLICATIONS

This application is a U.S. National Stage entry of PCT Application No: PCT/JP2017/027012 filed on Jul. 26, 2017, which claims priority to Japanese Patent Application No. 2016-146988 filed on Jul. 27, 2016, the contents of which are incorporated herein by reference.

TECHNICAL FIELD

This disclosure relates to a steering assistance device and a steering assistance method, and in particular to a technique for assisting steering during curve traveling.

BACKGROUND ART

A steering force control device has been proposed in which a neutral value of steering torque is changed according to curvature of the road so as to appropriately facilitate steering of a driver. For example, Patent Literature 1 discloses a technique in which an assist pinion connected to a rack via a speed reducer is driven by a steering assistance force generated by a steering assistance motor which is a drive source.

CITATION LIST

Patent Literature

Patent Literature 1: JP-A-H11-198844

SUMMARY

Technical Problem

In the above technique, a generation source of the steering assistance force is the motor alone. However, in a large-sized vehicle such as a bus or a truck, there is also a hydraulic cylinder powered by an engine which is a generation source of steering assistance force in addition to the motor.

There is a difference in output characteristics between the motor and the hydraulic cylinder as generation sources of the steering assistance force. Therefore, in a steering assistance device provided with both a motor and a hydraulic cylinder as generation sources of the steering assistance force, a technique for adjusting the output of the motor and the hydraulic cylinder is desired.

This disclosure provides a technique for adjusting output of a motor and a power cylinder in a steering assistance device including the motor and the power cylinder powered by hydraulic pressure as generation sources of a steering assistance force.

Solution to Problem

A steering assistance device according to a first aspect of this disclosure includes: a curvature calculation unit, which calculates curvature of a lane on which a vehicle travels; an auxiliary unit, which includes: a first auxiliary unit that generates torque to assist steering of the vehicle by hydraulic pressure and a second auxiliary unit that generates torque to assist the steering of the vehicle by electric power; and a steering control unit, which causes the first auxiliary unit to generate torque with decreasing by a predetermined amount and causes the second auxiliary unit to generate torque equal to or less than the predetermined amount, in a case where the first auxiliary unit is capable of generating a steering assistance force such that a steering angle of the vehicle reaches a target steering angle determined according to the curvature so as to make the vehicle travel in the center of a lane.

The steering assistance device may further include a speed measurement unit, which measures a travelling speed of the vehicle; and a steering-retention-force calculation unit, which calculates a steering retention force that is required to retain the target steering angle determined according to the curvature at the travelling speed measured by the speed measurement unit, wherein the steering control unit may cause the second auxiliary unit to generate torque in a direction canceling the steering retention force so as to minimize the steering retention force at the target steering angle.

A steering assistance method according to a second aspect of this disclosure includes: a step of detecting curvature of a lane on which a vehicle travels; a step of measuring a travelling speed of the vehicle; a step of calculating a steering retention force required for retaining a target steering angle determined according to the curvature at the measured travelling speed; a step of causing to reduce a steering assistance force based on hydraulic pressure; and a step of causing a motor to generate torque in a direction canceling the steering retention force so as to minimize the steering retention force at the target steering angle.

Advantageous Effects of the Invention

According to this disclosure, in a steering assistance device including a motor and a power cylinder powered by hydraulic pressure as generation sources of a steering assistance force, the output of the motor and the power cylinder can be adjusted.

DESCRIPTION OF EMBODIMENTS

Overview of Embodiment

Figure 1:
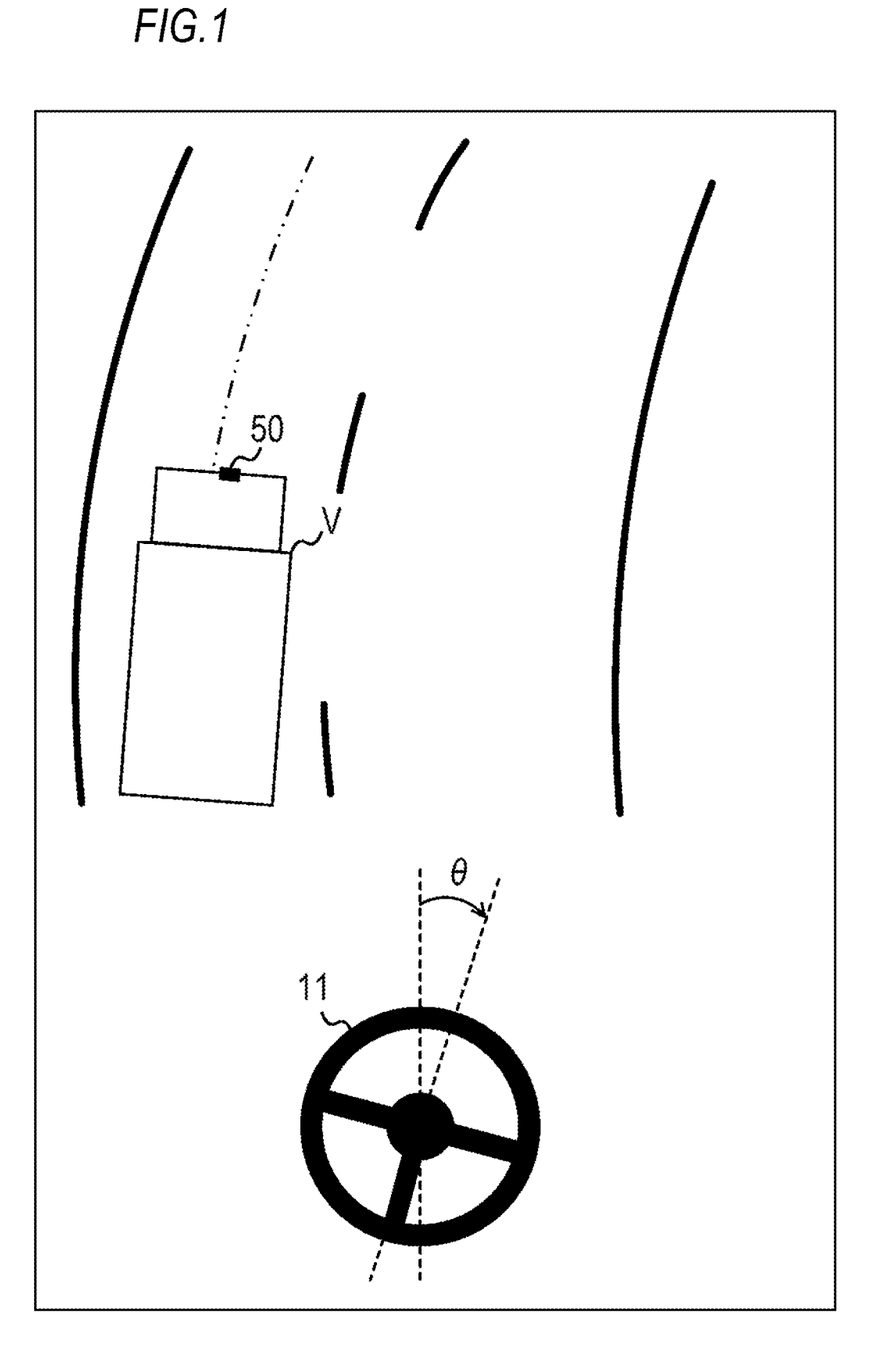
FIG. 1 is a diagram for explaining an overview of a steering assistance device according to an embodiment.

FIG. 1 is a diagram for explaining an overview of a steering assistance device according to an embodiment. The steering assistance device according to the embodiment is mounted on a vehicle V and is used for assisting steering when the vehicle V travels on a curve. Although not limited, the steering assistance device according to the embodiment is suitably used for a large-sized vehicle V such as a bus or a truck. In the following specification, it is assumed that the vehicle V is a large-sized vehicle V such as a bus or a truck.

In general, torque is applied to a steering wheel 11 of the vehicle V in a direction in which the vehicle V goes straight, that is, in a direction in which a steering angle is 0 degree. Accordingly, in order to make the vehicle V travel on the curve, a driver applies a steering retention force that counteracts the torque to the steering wheel 11, and thus the vehicle V travels along the curve. The steering assistance device according to the embodiment cooperates with a motor and a hydraulic cylinder mounted on the vehicle V to assist the steering of the vehicle V during the curve travel.

Specifically, the steering assistance device analyzes an image in front of the vehicle V captured by an imaging device 50 and calculates the curvature of the lane on which the vehicle V travels. The steering assistance device assists the steering of the vehicle V to reach a steering retention angle θ of the steering wheel 11 to be retained for traveling along the lane of the vehicle V.

That is, although a steering retention force which is the torque required to maintain an angle of the steering wheel 11 of the vehicle V is generally changed according to a steering angle, the steering assistance device controls the steering such that the steering retention force is minimized at the steering retention angle θ determined according to the curvature of the lane. Therefore, the driver of the vehicle V can sense the steering retention angle θ to be maintained by the torque transmitted from the steering wheel 11, so that the vehicle V can naturally travel along the curve.

Configuration of Steering Assistance System

Figure 2:
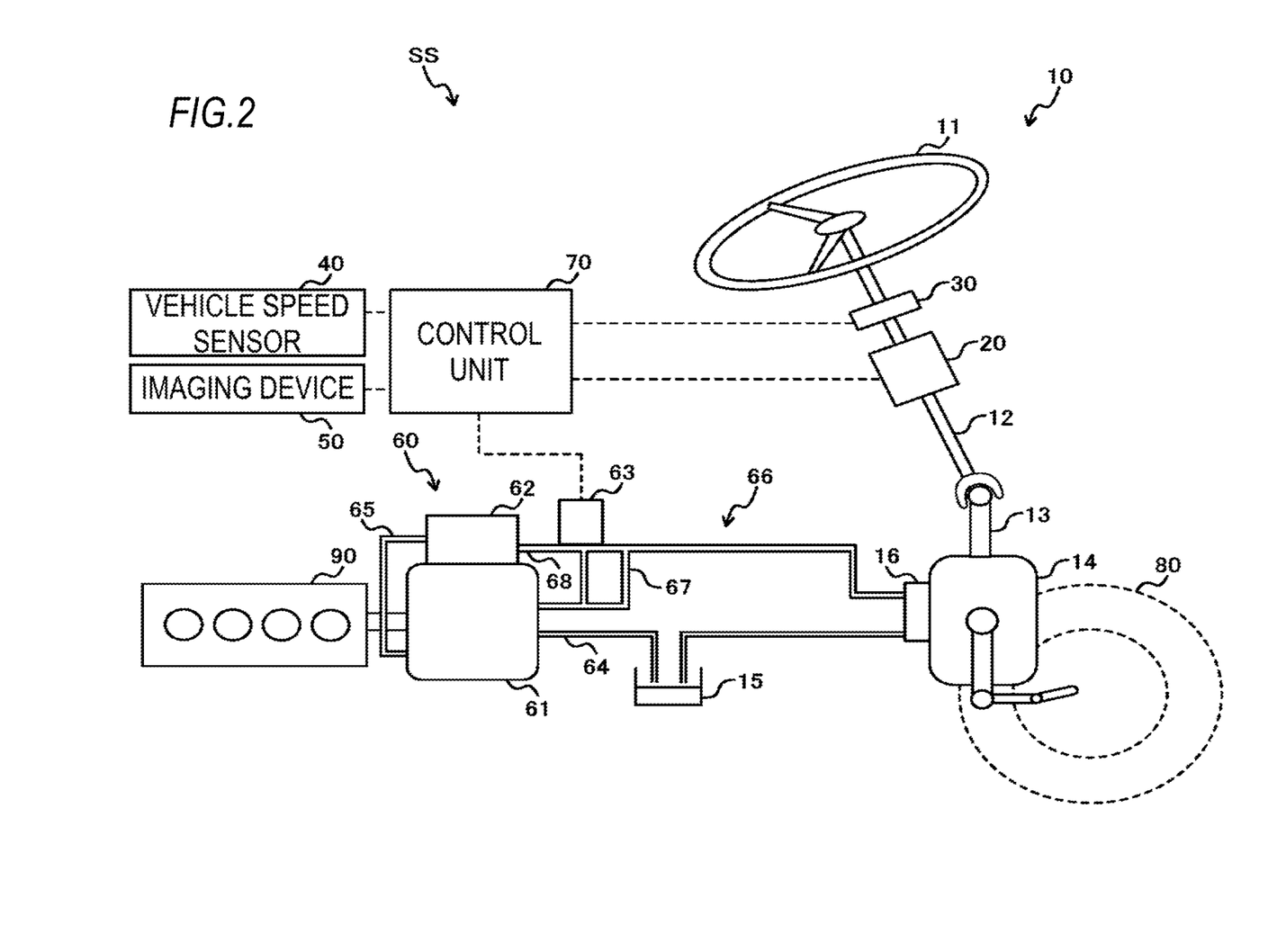
FIG. 2 is a diagram schematically showing a configuration of a steering assistance system according to the embodiment.

FIG. 2 is a diagram schematically showing a configuration of a steering assistance system SS according to the embodiment. As shown in FIG. 2, the steering assistance system SS includes an integral type steering unit 10, a motor 20, a steering angle sensor 30, a vehicle speed sensor 40, an imaging device 50, a pump unit 60, and a control unit 70.

The integral type steering unit 10 is a unit for assisting a steering operation of a driver. The integral type steering unit 10 includes a steering wheel 11, a steering shaft 12, a stub shaft 13, a power cylinder unit 14, a reservoir tank 15, and a control valve 16.

One end of the steering shaft 12 is connected to the steering wheel 11, and the other end is connected to the stub shaft 13. One end of the stub shaft 13 is connected to the steering shaft 12 and the other end is connected to an input shaft of the power cylinder unit 14. The steering shaft 12 and the stub shaft 13 transmit the steering torque applied to the steering wheel 11 to the power cylinder unit 14.

The power cylinder unit 14 transmits a driving force to a steered wheel 80 of the vehicle V.

The reservoir tank 15 stores hydraulic oil to be supplied to the power cylinder unit 14.

The control valve 16 controls an oil amount of the hydraulic oil to be supplied to the power cylinder unit 14 and applies the hydraulic pressure corresponding to the steering torque to the internal of the power cylinder unit 14 to assist the steering operation of the driver.

The motor 20 is attached to the steering shaft 12. The motor 20 is rotationally driven by electric power supplied from the control unit 70, and thus assistance torque (steering assistance force) is applied to the steering shaft 12 to assist the steering operation of the driver. The motor 20 mainly provides a steering induction function to make the vehicle V travel along the traveling lane.

The steering angle sensor 30 is provided on the steering shaft 12, detects a rotation amount of the steering shaft 12, and detects a steering angle based on the rotation amount. The steering angle sensor 30 outputs the detected steering angle to the control unit 70.

The vehicle speed sensor 40 detects a speed of the vehicle V. The vehicle speed sensor 40 outputs the detected speed to the control unit 70.

The imaging device 50 is an in-vehicle camera mounted on the vehicle V. The imaging device 50 captures the front of the traveling direction of the vehicle V, the front including the lane on which the vehicle V travels. The imaging device 50 outputs the captured image to the control unit 70.

The pump unit 60 is a known variable displacement pump. The pump unit 60 controls a flow rate of driving oil supplied to the power cylinder unit 14 based on the movement of the steering wheel 11 under the control of the control unit 70, so as to provide a power assistance function for further transmitting a force, which is in the same direction as the steering force transmitted to the power cylinder unit 14, to the power cylinder unit 14.

The pump unit 60 includes a pump housing 61, a control valve 62, and a electromagnetic valve 63.

The pump housing 61 defines and forms a pump chamber therein. The pump chamber is connected to the reservoir tank 15 via a suction passage 64 and sucks the hydraulic oil from the reservoir tank 15 via the suction passage 64. The pump chamber is connected to a first connection passage 65 through which the hydraulic oil is supplied to the control valve 62 and is connected to a second connection passage 66 through which the hydraulic oil is supplied to the control valve 16.

The second connection passage 66 includes a main oil passage 67 connected to the control valve 16 and an auxiliary oil passage 68 that can be opened and closed and is connected to the control valve 62.

The control valve 62 cooperates with the electromagnetic valve 63 to control the flow rate of the hydraulic oil to be supplied to the power cylinder unit 14.

The electromagnetic valve 63 controls the opening and closing of the auxiliary oil passage 68. The electromagnetic valve 63 performs control such that electric power is supplied based on the steering angle detected by the steering angle sensor 30 and the traveling speed of the vehicle V detected by the vehicle speed sensor 40 that are from the control unit 70.

For example, since the steering assistance force is required as the steering angle increases, an amount of electricity supplied to the electromagnetic valve 63 increases as the steering angle increases. Since the steering assistance force is required as the speed of the vehicle V decreases, the amount of electricity supplied to the electromagnetic valve 63 increases as the traveling speed of the vehicle V decreases.

The electromagnetic valve 63 closes the auxiliary oil passage 68 in a non-energized state. When the auxiliary oil passage 68 is closed, the control valve 62 decreases a pump discharge amount in the pump unit 60. Meanwhile, the electromagnetic valve 63 opens the auxiliary oil passage 68 in an energized state. When the auxiliary oil passage 68 is opened, the control valve 62 increases the pump discharge amount in the pump unit 60.

The imaging device 50 is an in-vehicle camera mounted on the vehicle V. The imaging device 50 captures an image in front of the vehicle V in the traveling direction and the image including the lane on which the vehicle V travels. The control unit 70 analyzes the image captured by the imaging device 50 and calculates curvature of the lane on which the vehicle V travels. The control unit 70 calculates a target steering angle necessary for the vehicle V to travel on the lane based on the calculated curvature. The control unit 70 realizes support of keeping the vehicle V on the lane by controlling the power cylinder unit 14 and the motor 20 based on the calculated target steering angle.

As described above, the steering assistance device 1 according to the embodiment functions as power assistance and support of keeping the vehicle V on the lane, but the functional configuration of the steering assistance device 1 for realizing the support function of keeping the vehicle V on the lane will be mainly described below.

Functional Configuration of Steering Assistance Device 1

Figure 3:
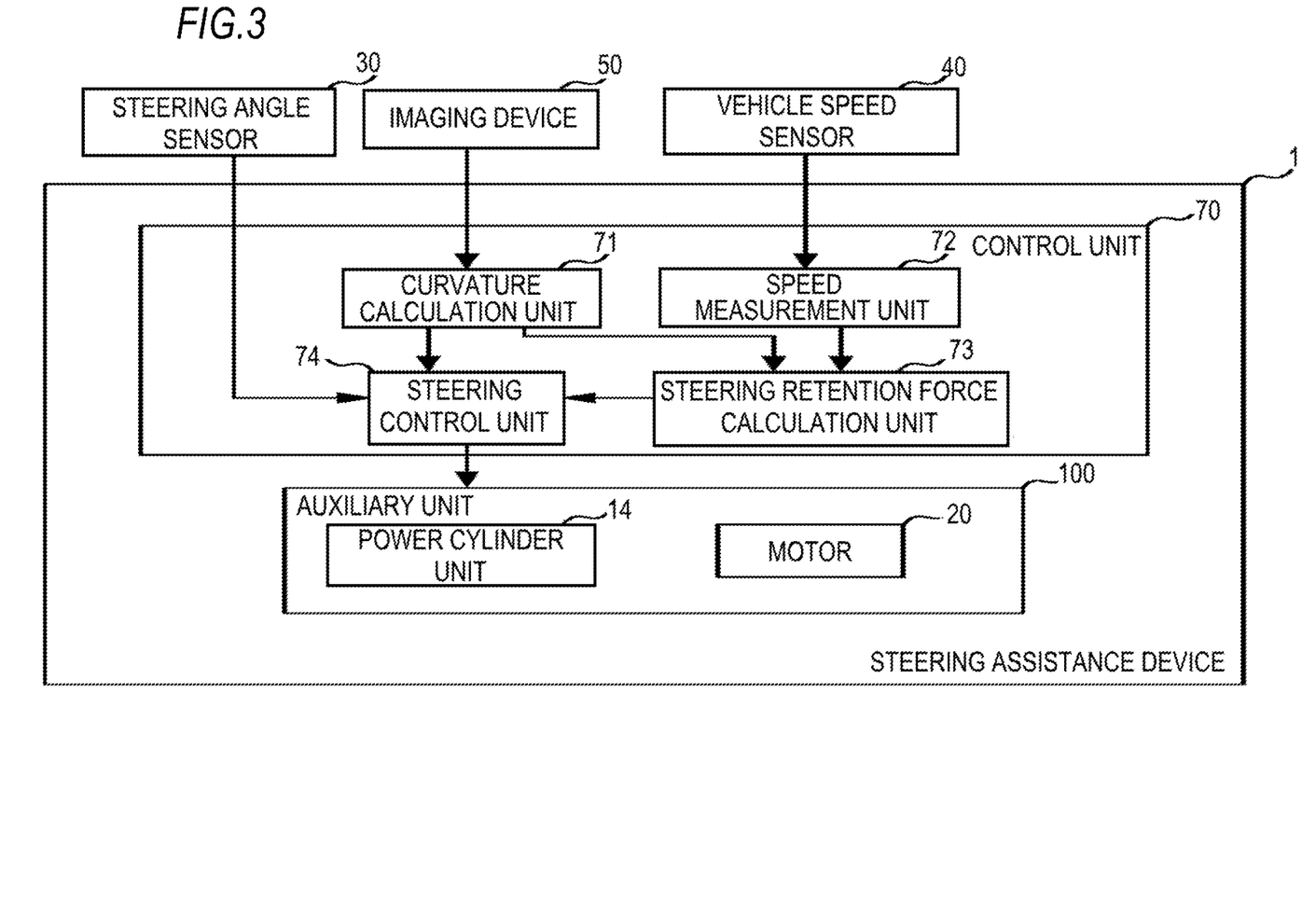
FIG. 3 is a diagram schematically showing a functional configuration of the steering assistance device according to the embodiment.

FIG. 3 is a diagram schematically showing a functional configuration of the steering assistance device 1 according to the embodiment.

The steering assistance device 1 includes a control unit 70 and an auxiliary unit 100. The control unit 70 is a calculation resource including a CPU (Central Processing Unit), a memory or the like (not shown) and realizes functions of a curvature calculation unit 71, a speed measurement unit 72, a steering-retention-force calculation unit 73, and a steering control unit 74 by executing a program.

The auxiliary unit 100 is a mechanism that assists the driver of the vehicle V to move the steered wheel 80 by operating the steering wheel 11, and includes the motor 20 and the power cylinder unit 14. The power cylinder unit 14 functions as a first auxiliary unit for generating, by hydraulic pressure, torque for assisting the steering of the vehicle V. The motor 20 functions as a second auxiliary unit for generating, by electric power, torque for assisting steering of the vehicle V.

The curvature calculation unit 71 acquires the image captured by the imaging device 50. The curvature calculation unit 71 calculates the curvature of the lane on which the vehicle V travels by analyzing the acquired image. Specifically, the curvature calculation unit 71 calculates the curvature of the lane by extracting a lane defining line of the lane on which the vehicle V travels using a known image processing technique such as edge extraction.

The speed measurement unit 72 measures a travelling speed of the vehicle V using the vehicle speed sensor. The steering-retention-force calculation unit 73 calculates a target steering angle determined according to the curvature calculated by the curvature calculation unit 71. The steering-retention-force calculation unit 73 further calculates a steering retention force required for retaining the calculated target steering angle at the traveling speed measured by the speed measurement unit 72.

The steering control unit 74 causes the motor 20 to generate a steering assistance force in a direction canceling the steering retention force so as to minimize the steering retention force to be applied to the driver of the vehicle V at the target steering angle calculated by the steering-retention-force calculation unit 73. Here, the steering control unit 74 causes the motor 20 to generate torque in the direction cancelling the steering retention force even when the power cylinder unit 14 can independently generate the steering assistance force. More specifically, the steering control unit 74 reduces the torque generated by the power cylinder unit 14 during straight traveling of the vehicle V by a predetermined amount and causes the motor 20 to generate torque equal to or less than the decreased predetermined amount.

Figure 4A:
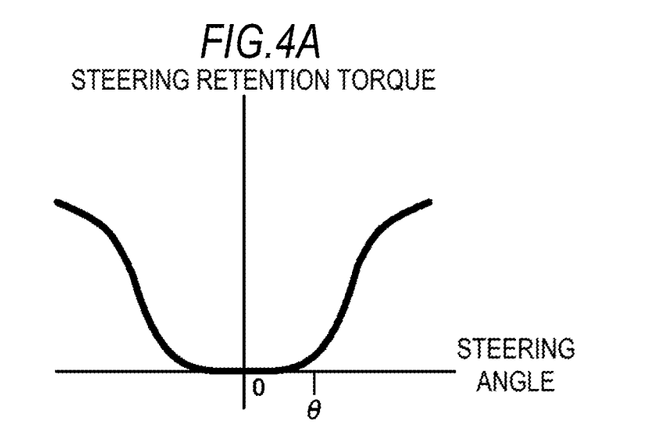
FIGS. 4A to 4D are diagrams for explaining torque control of an auxiliary unit executed by a steering control unit according to the embodiment.
Figure 4B:
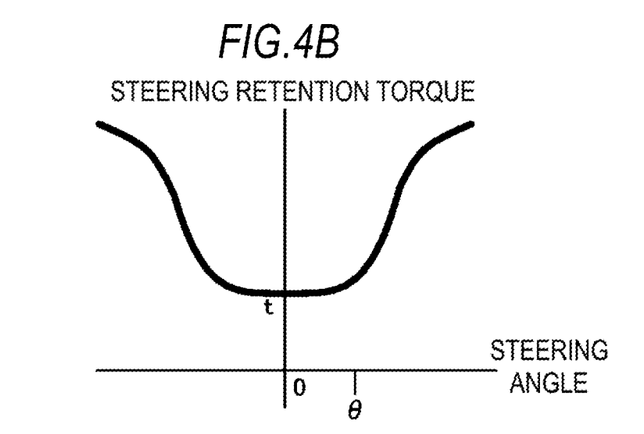
Figure 4C:
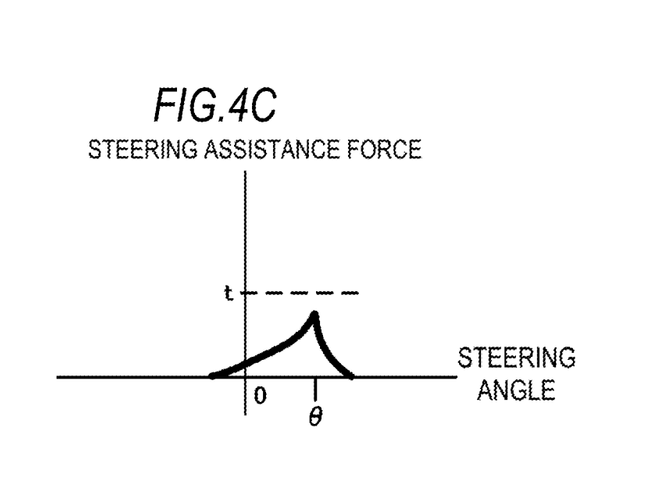
Figure 4D:
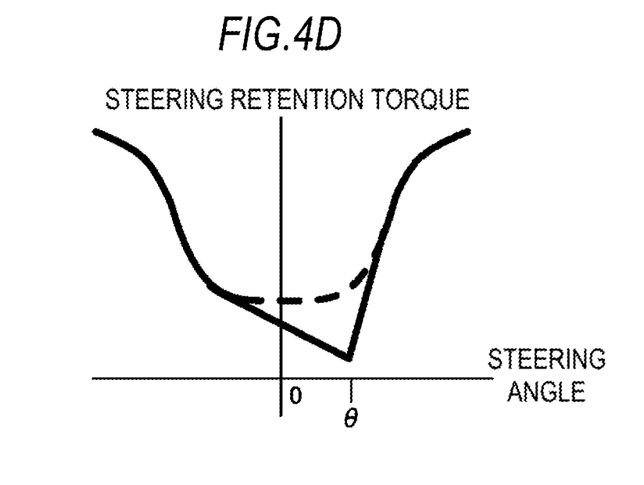

FIGS. 4A to 4D are diagrams for explaining torque control of the auxiliary unit 100 executed by the steering control unit 74 according to the embodiment. FIGS. 4A, 4B and 4D are diagrams showing the relationship between the steering angle and the torque, wherein a horizontal axis represents the steering angle of the steering wheel 11 and the vertical axis represents the magnitude of the torque which is a resistance force felt by the driver who operates the steering wheel 11. FIG. 4C is a diagram showing the relationship between the steering angle and the torque, wherein the horizontal axis represents the steering angle of the steering wheel 11 and the vertical axis represents the torque generated by the motor 20 under the control of the steering control unit 74.

In FIGS. 4A to 4D, the steering angle is a negative value when the driver of the vehicle V turns the steering wheel 11 to the left, and the steering angle is a positive value when steering wheel 11 is turned to the right. For convenience of explanation below, the magnitude of the torque that is a resistance force felt by the driver who operates the steering wheel 11 may be referred to as "steering retention torque", and the magnitude of the torque generated by the power cylinder unit 14 or the motor 20 under the control of the steering control unit 74 may be referred to as "steering assistance force".

FIG. 4A is a diagram showing the relationship between the steering angle and the steering retention torque during straight traveling of the vehicle V equipped with the steering assistance device 1 according to the embodiment. When the vehicle V travels straight ahead, the steering control unit 74 stops the output of the steering assistance force generated by the motor 20 and outputs only the steering assistance force generated by the power cylinder unit 14.

As shown in FIGS. 4A to 4D, in a case where the steering assistance is realized only by the steering assistance force generated by the power cylinder unit 14, the change in steering retention torque tends to decrease when the steering angle is around 0 degree. Therefore, the diagrams showing the relationship between the steering angle and the steering retention torque is substantially U-shaped.

In FIGS. 4A to 4D, an angle θ indicates the target steering angle calculated by the steering-retention-force calculation unit 73. That is, it indicates that it is necessary for the driver to keep the steering wheel 11 turned to the right by an angle θ in order to make the vehicle V travel along the lane.

In a case where only the steering assistance force generated by the power cylinder unit 14 is output as shown in FIG. 4A, that is, in a case where the auxiliary unit 100 realizes only the power assist function, as the driver tries to turn the steering wheel 11 further to the right side than the angle θ, the steering retention torque increases, and conversely, as the angle is smaller than the angle θ, the steering retention torque decreases. That is, the force acts on the steering wheel 11 in a direction in which the steering angle decreases.

Therefore, the steering control unit 74 controls the output of the power cylinder unit 14 and the motor 20 so as to minimize the steering retention torque at the angle θ. Specifically, the steering control unit 74 first lowers the output of the power cylinder unit 14 as a whole by a predetermined amount t. As a result, a shape of the diagram showing the relationship between the steering angle and the steering retention torque is as shown in FIG. 4B. Assuming that the steering wheel 11 is operated in a state where the characteristic of the steering retention torque is as shown in FIG. 4B, the driver of the vehicle V feels that the steering wheel 11 as a whole becomes heavier by the torque represented by the predetermined amount t.

The steering control unit 74 lowers the output of the power cylinder unit 14 by the predetermined amount t and at the same time causes the motor 20 to output torque whose maximum value is equal to or less than the predetermined amount t.

FIG. 4C is a diagram showing the relationship between the steering assistance force output by the motor 20 under the control of the steering control unit 74 and the steering angle. As shown in FIG. 4C, the steering control unit 74 causes the motor 20 to output the steering assistance force directed in the same direction as the steering direction of the steering wheel 11 so as to maximize the steering angle when the steering angle is the angle θ. When the steering angle deviates from the angle θ, the steering control unit 74 decreases the torque output by the motor 20 as the degree of deviation increases.

FIG. 4D is a diagram showing characteristics of the steering retention torque in a case where the steering control unit 74 lowers the output of the power cylinder unit 14 by the predetermined amount t and causes the motor 20 to output the torque according to the steering angle of the steering wheel 11. As shown in FIG. 4D, when the steering angle of the steering wheel 11 is the angle θ which is the target steering angle, the steering retention force is minimized. In addition, the steering retention force increases as the steering angle of the steering wheel 11 deviates from the angle θ which is the target steering angle.

Accordingly, the steering control unit 74 controls the output of the power cylinder unit 14 and the motor 20 such that the steering angle of the steering wheel 11 is a so-called valley at the angle θ. Then, the steering control unit 74 determines the shape of torque to be generated by the motor 20 in consideration of the torque characteristic of the power cylinder unit 14 in the vicinity of the angle θ. As a result, since the steering angle of the steering wheel 11 can be set to the so-called valley at the angle θ, the driver of the vehicle V can sense the resistance of transmitting the steering angle of the steering wheel 11 to the hand, in order to make the vehicle V travel along the lane.

As shown in FIGS. 4A to 4D, although the steering control unit 74 controls the power cylinder unit 14 and the motor 20 such that the steering retention force is minimized when the steering angle of the steering wheel 11 is the angle θ which is the target steering angle, it is preferable that the minimum value of the steering retention force is greater than 0. In this case, in order to drive the vehicle V along the lane, the driver of the vehicle V needs to intentionally apply a force to the steering wheel 11. Accordingly, it is possible to suppress a situation in which the driver drives the vehicle V unthinkingly.

Therefore, the "predetermined amount t", which is the amount by which the steering control unit 74 lowers the output of the power cylinder unit 14, is preferably equal to or less than the maximum value of the torque that the motor 20 can output. Accordingly, the steering control unit 74 can arbitrarily set the minimum value of the steering retention force between 0 and the predetermined amount t.

Flow of Steering Assistance Process Executed by Steering Assistance Device 1

Figure 5:
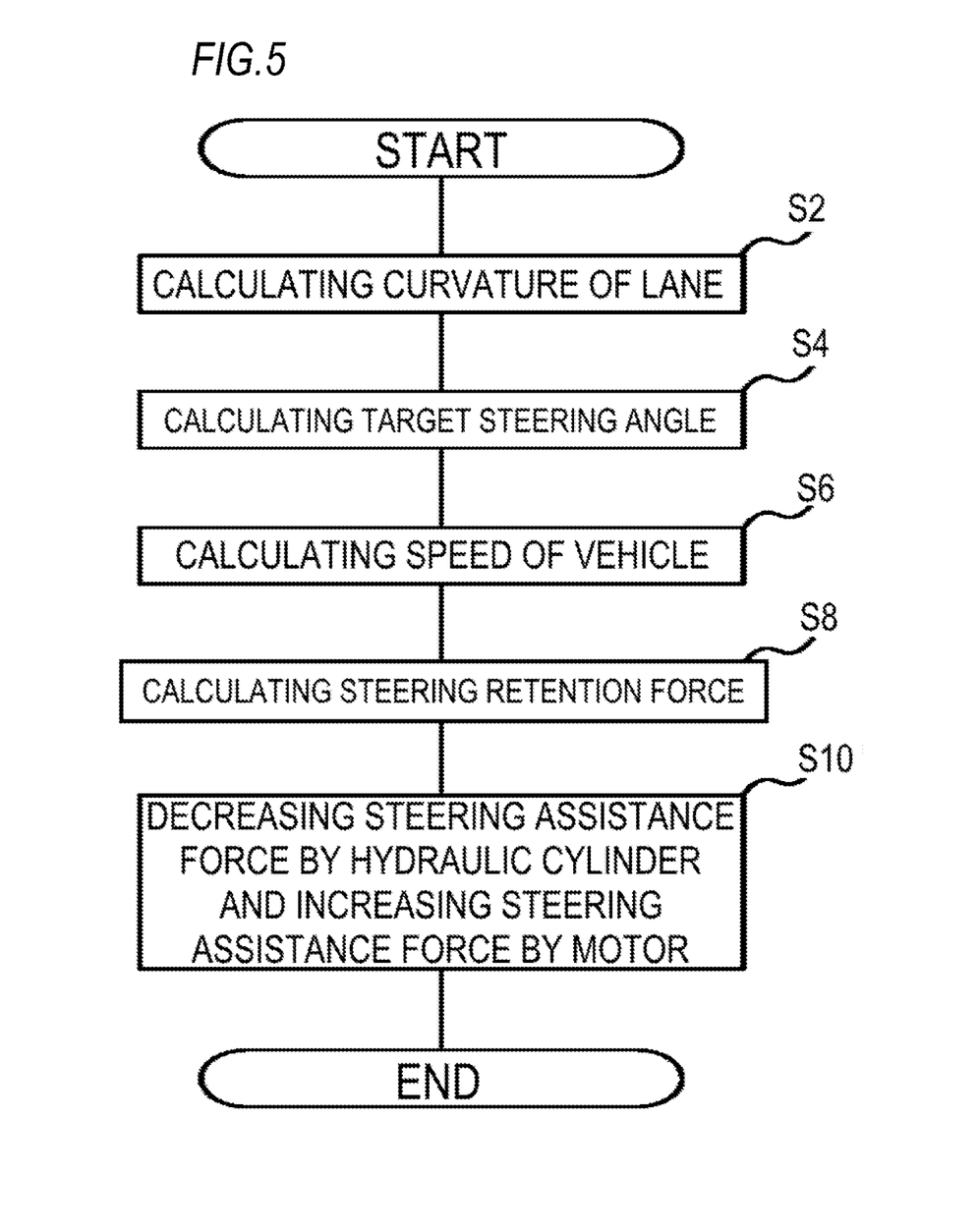
FIG. 5 is a flow chart for explaining a flow of a steering assistance process executed by the steering assistance device according to the embodiment.

FIG. 5 is a flow chart for explaining a flow of a steering assistance process executed by the steering assistance device 1 according to the embodiment. The process in this flow chart starts, for example, when the engine of the vehicle V is started.

The curvature calculation unit 71 analyzes an image captured by the imaging device 50 and detects curvature of a lane on which the vehicle V travels (S2). The steering-retention-force calculation unit 73 calculates (S4) a target steering angle determined according to the curvature calculated by the curvature calculation unit 71.

The speed measurement unit 72 detects (S6) a vehicle speed of the vehicle V using the vehicle speed sensor. The steering-retention-force calculation unit 73 calculates (S8) a steering retention force required to retain a target steering angle calculated at the traveling speed measured by the speed measurement unit 72.

The steering control unit 74 decreases the steering assistance force generated by the power cylinder unit 14 by a predetermined amount, and increases the steering assistance force generated by the motor 20 when the vehicle V travels straight (S10).

When the steering control unit 74 controls the steering assistance force generated by the power cylinder unit 14 and the motor 20, the process in this flow chart ends. The steering assistance device 1 continues controlling the steering assistance force during traveling of the vehicle V by repeating the above process during traveling of the vehicle V.

As described above, according to the steering assistance device 1 according to the embodiment, the output of the power cylinder unit 14 and the motor 20 can be adjusted in the steering assistance device 1 including the power cylinder unit 14 and the motor 20 as sources of the steering assistance force.

In particular, the steering control unit 74 does not cause the power cylinder unit 14 to generate the steering assistance force all by itself, even in a case where the power cylinder unit 14 can generate a steering assistance force all by itself such that the steering angle of the vehicle V can reach the target steering angle determined according to the curvature of the lane. The steering control unit 74 reduces the steering assistance force generated by the power cylinder unit 14 and supplements the steering assistance force corresponding to the reduced steering assistance force with the output of the motor 20.

In general, the motor 20 can generate torque larger than that of the power cylinder unit 14 while the power cylinder unit 14 can more finely adjust the generated torque than the motor 20. Therefore, since the steering control unit 74 compensates the reduction in the steering assistance force of the power cylinder unit 14 with the steering assistance force of the motor 20, the relationship between the steering angle and the steering retention torque can be finely adjusted.

Specifically, in order to minimize the steering retention force required for retaining the target steering angle determined according to the curvature of the lane at the travelling speed of the vehicle V, the steering assistance force is generated in the power cylinder unit 14. Accordingly, the driver of the vehicle V can sense the resistance of transmitting the steering angle of the steering wheel 11 to the hand in order to make the vehicle V travel along the lane.

Although this disclosure has been described using the embodiment, the technical scope of this disclosure is not limited to the scope described in the above embodiment. It is apparent to those skilled in the art that various modifications or improvements may be added to the above embodiment. It is also apparent from description of the scope of claims that an embodiment with such alterations or improvements can be included in the technical scope of the present disclosure.

The present application is based on Japanese Patent Application No. 2016-146988 filed on Jul. 27, 2016, contents of which are incorporated herein as reference.

INDUSTRIAL APPLICABILITY

According to this disclosure, it is possible to adjust the output of the motor and the power cylinder in the steering assistance device including the motor and the power cylinder powered by hydraulic pressure as sources of generation of a steering assistance force.

DESCRIPTION OF REFERENCE NUMERALS 1 steering assistance device
10 integral type steering unit
11 steering wheel
12 steering shaft
13 stub shaft
14 power cylinder unit
15 reservoir tank
16 control valve
20 motor
30 steering angle sensor
40 vehicle speed sensor
50 imaging device
60 pump unit
61 pump housing
62 control valve
63 electromagnetic valve
64 suction passage
65 first connection passage
66 second connection passage
67 main oil passage
68 auxiliary oil passage
70 control unit
71 curvature calculation unit
72 speed measurement unit
73 steering retention force calculation unit
74 steering control unit
80 steered wheel
100 auxiliary unit
SS steering assistance system
V vehicle

The invention claimed is:

1. A steering assistance device, comprising:
a curvature calculation unit, which calculates curvature of a lane on which a vehicle travels;
an auxiliary unit, which includes: a first auxiliary unit that generates torque to assist steering of the vehicle by hydraulic pressure and a second auxiliary unit that generates torque to assist the steering of the vehicle by electric power; and
a steering control unit, which causes the first auxiliary unit to generate torque with decreasing by a predetermined amount and causes the second auxiliary unit to generate torque equal to or less than the predetermined amount, in a case where the first auxiliary unit is capable of generating a steering assistance force such that a steering angle of the vehicle reaches a target steering angle determined according to the curvature so as to make the vehicle travel in the center of a lane.

2. The steering assistance device according to claim 1, further comprising:
a speed measurement unit, which measures a travelling speed of the vehicle; and
a steering-retention-force calculation unit, which calculates a steering retention force that is required to retain the target steering angle determined according to the curvature at the travelling speed measured by the speed measurement unit,
wherein the steering control unit causes the second auxiliary unit to generate torque in a direction canceling the steering retention force so as to minimize the steering retention force at the target steering angle.

3. A steering assistance method, comprising:
a step of detecting curvature of a lane on which a vehicle travels;
a step of measuring a travelling speed of the vehicle;
a step of calculating a steering retention force required for retaining a target steering angle determined according to the curvature at the measured travelling speed;
a step of causing to reduce a steering assistance force based on hydraulic pressure; and
a step of causing a motor to generate torque in a direction canceling the steering retention force so as to minimize the steering retention force at the target steering angle.

* * * * *